United States Patent [19]

Sharp

[11] Patent Number: 5,502,880
[45] Date of Patent: Apr. 2, 1996

[54] MANUFACTURE OF PISTON RINGS

[75] Inventor: Richard J. Sharp, Rugby, United Kingdom

[73] Assignee: T&N Technology Limited, Rugby, England

[21] Appl. No.: 295,881

[22] PCT Filed: Mar. 1, 1993

[86] PCT No.: PCT/GB93/00420

§ 371 Date: Sep. 6, 1994

§ 102(e) Date: Sep. 6, 1994

[87] PCT Pub. No.: WO93/17807

PCT Pub. Date: Sep. 16, 1993

[30]    Foreign Application Priority Data

Mar. 11, 1992 [GB] United Kingdom ............... 9205258

[51] Int. Cl.⁶ .................................................. B23P 23/00
[52] U.S. Cl. .................................... 29/33 Q; 29/888.073; 72/168
[58] Field of Search ............................ 29/33 Q, 33 R, 29/888.073, 888.07; 72/168, 177

[56]    References Cited

U.S. PATENT DOCUMENTS 3,635,063  1/1972  Stern et al. ............................... 72/130
3,746,238  7/1973  Sprague ................................ 72/168 X
5,068,963  12/1991 Bruce ................................... 29/888.073

FOREIGN PATENT DOCUMENTS 568116   12/1958  Canada ............................ 29/888.073
0157537  10/1985  European Pat. Off. .......... B21D 7/08
0186072  7/1986   European Pat. Off. ........ B23D 31/00
3942191  7/1990   Germany ............................... 29/33 Q
2220600  1/1990   United Kingdom ............ B21D 11/10

Primary Examiner—William Briggs
Attorney, Agent, or Firm—Synnestvedt & Lechner

[57]    ABSTRACT

A machine for manufacturing piston rings from the metal strip (10). The machine comprises feeding means (12) for feeding the strip, shaping means (14, 16, 18, 20) for shaping successive portions of the strip into piston rings of a desired shape, and severing means (22) operable to sever the piston rings from the remainder of the strip. The machine also comprises displacing means (28) operable during each operation of the severing means (22) to move the severing means to substantially reduce the relative movement between the severing means and the point on the strip (10) at which the strip is severed. The severing means (22) is moved along a linear path which extends substantially tangentially to the path of said point.

11 Claims, 3 Drawing Sheets

MANUFACTURE OF PISTON RINGS

This invention is concerned with a machine for manufacturing piston rings in particular piston rings for internal combustion engines, although such rings may be utilised for other purposes, eg pistons for compressors.

Piston rings for internal combustion engines are commonly formed of metal to a desired shape which is generally oval. The ring has two free ends which are closely adjacent to one another but do not touch. Each piston ring is intended to be received in a groove provided in the piston of an internal .combustion engine to provide a seal between the piston and the cylinder in which the piston reciprocates. The shape to which the piston ring is manufactured has to be precisely controlled so that the ring will provide an effective seal.

In EP 0,157,537 B1, a machine for manufacturing piston rings from metal strip is described in which a variable curvature is imparted to the strip to give the desired shape. The machine passes the strip to a fixed guide which imparts a desired minimum radius of curvature to the strip. This minimum radius of curvature is the minimum radius of curvature required anywhere on the circumference of the formed ring. After the fixed guide, the machine passes the strip to a movable guide, in the form of a roller, which bends the strip to increase its radius of curvature to the particular radius of curvature required at each point around the ring. The movable guide is moved as the strip passes it by a control system of the machine so that a ring of the required shape is achieved. In this machine, the completed ring is severed from the remainder of the strip by stopping the feed of the strip when the ring has been formed and then cutting the strip using, for example, a grinding wheel. As an alternative, it is suggested that a number of rings can be formed into a helical coil which is subsequently cut into individual rings.

GB 2,220,600 A describes a method of utilising a machine of the type described in EP 0,157,537 B1 to make more accurate rings. In this method, the strip is bent to a uniform radius of curvature, which is at least 2% below the minimum radius of curvature required, before being bent to the required radius of curvature by the movable guide. The machine utilised in this method has a high speed cropper which severs the rings from the strip without arresting feed of the strip. The movement of the strip during severing is accommodated by the elasticity of the strip.

The machines described in EP 0,157,537 B1 and GB 2,220,600 A have disadvantages concerned with the severing of the completed rings from the remainder of the strip. During bending of the strip, the metal thereof is in a plastic state so that, if the feeding of the strip is stopped to allow severing, creep can occur within the metal. The portion of the strip being formed at the instant that the feed is stopped, is then found to have a lower radius of curvature than if the feed had been continuous. The stopping of the feed also causes a lower production rate. The alternative of forming a number of rings into a coil which is subsequently cut is not desirable because the coil is awkward to handle and position correctly relative to severing means. The high speed cropper of GB 2,220,600 A is found to cause deformation of the rings from the desired shape because it stops the feed albeit only briefly. The strip is also subjected to stress as the feeding means presses the strip against the cropper during severing.

EP 0,186,072 A describes a machine for severing relatively large circular or part-circular items formed from strip, such as bicycle wheel rims, mudguards, or barrel hoops. In that machine, a pivot is provided at the centre of curvature of the item being severed and the severing mechanism is moved arcuately about said pivot to provide a match between the speed of the strip and the severing mechanism. This technique is somewhat imprecise by the standards required in piston ring manufacture but is, in any case, not suitable for use with piston rings which are not of a circular form so that there is no centre of curvature at which to position a pivot. Piston rings are also generally too small to provide room for a pivot within the ring.

It is an object of the present invention to provide a machine for manufacturing piston rings in which the above-mentioned disadvantages are alleviated.

The invention provides a machine for manufacturing piston rings from metal strip, the machine comprising feeding means operable to feed metal strip, shaping means operable to shape metal strip fed by the feeding means so that successive portions of the strip are formed into piston rings of a desired shape, and severing means operable to sever successive piston rings shaped by the shaping means from the remainder of the strip, characterised in that the machine also comprises displacing means operable during each operation of the severing means to displace the severing means along a linear path which extends substantially tangentially to the path of movement of the point on the strip at which the strip is severed to substantially reduce the relative movement between the severing means and said point.

In a machine according to the invention, the displacing means can be utilised to match or substantially match the speed of the severing means with the speed of the point on the strip at which the strip is severed. This means that there is little or no stress caused by the feeding means pressing the strip against the severing means and the strip does not-have to be stopped. The tangential movement of the severing means is much simpler than providing arcuate movement and this arrangement, is found to give adequate results. This arrangement also avoids the need for the severing means to be moved along different arcuate paths for different piston ring sizes.

Preferably, the displacing means comprises a servo motor operable to displace the severing means along its path in substantial synchronisation with the movement of said point on the strip. The use of a servo motor enables the operation of the displacing means to be commenced at an appropriate moment and the acceleration of the severing means to be controlled so that, during contact between the severing means and the strip, there is no, or substantially no, relative movement between the severing means and the strip. Advantageously, the servo motor also operates the severing means, thereby ensuring synchronisation between said operation and the movement of the severing means. The displacing means may comprise an eccentric driven by the servo-motor, the eccentric being arranged so that rotation of the eccentric causes displacement of the severing means and operation thereof.

Preferably, the machine comprises control means operable to operate the displacing means and the severing means in response to the feeding of a predetermined length, corresponding to the circumference of one ring, of the metal strip by the feeding means. This length is, preferably, detected by an encoder operable to provide a signal representing the length of the strip which has been fed.

The severing means may comprise a blade member arranged to be moved into the strip, and an anvil member arranged to brace the strip against movement away from the blade member.

In order to enable the orientation of the strip when it is severed to be accommodated, said linear path may be adjustable angularly about an axis extending normally to the plane of a piston ring to be severed, or about an axis extending in the plane of a piston ring to be severed, or about both said axes.

In order to prevent distortion of the piston ring, the machine may also comprise spring-loaded stripper means co-planar with said anvil member and displaceable by the movement of said blade member.

There now follows a detailed description, to be read with reference to the accompanying drawings, of a machine for manufacturing piston rings from metal strip which is illustrative of the invention.

Figure 1:
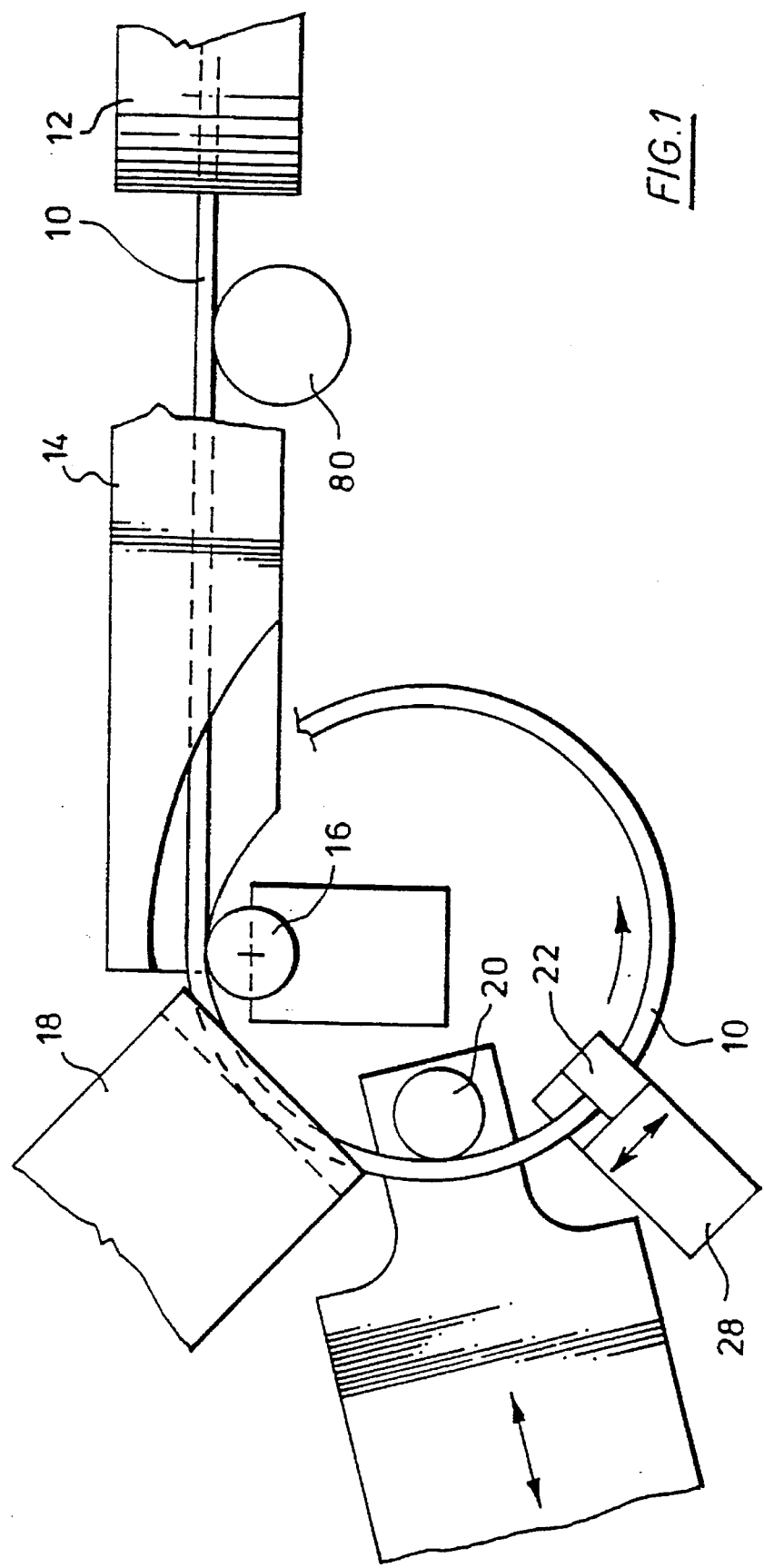
FIG. 1 is a diagrammatic elevational view showing the general layout of the illustrative machine.

As shown in FIG. 1, the illustrative machine is for manufacturing piston rings from metal strip and comprises feeding means operable to feed the metal strip 10. The feeding means comprises feed rollers 12 (one shown in FIG. 1) operable to grip the strip 10 and advance it (to the left viewing FIG. 1). The machine also comprises a guide 14 which operates to maintain the strip 10 aligned in a straight path as it leaves the feed rollers 12.

The illustrative machine also comprises shaping means operable to shape the metal strip 10 fed by the feeding means so that successive portions of the strip 10 are formed into piston rings of a desired shape. The shaping means acts on the strip after it leaves the guide 14. The shaping means comprises a fulcrum pin 16 engaging an inside surface of the strip 10, an adjustable guide 18 for imparting a fixed minimum radius of curvature to the strip 10, and a movable guide 20 acting to decrease the curvature of the strip 10 in accordance with the desired shape of the piston ring. The guide 18 is adjusted for a particular ring shape and thereafter remains stationary during formation of the successive rings. The guide 18 engages an outside surface of the strip 10 and imparts a radius of curvature which is a minimum radius of curvature to the strip. The minimum radius of curvature is actually smaller than the smallest radius of curvature of the desired shape as explained in GB 2,220,600 A. The movable guide 20 engages the inside surface of the strip 10 and is moved during the formation of a piston ring so that the radius of curvature of the strip is increased from the minimum radius of curvature by controlled amounts along the length of the strip to give the desired shape.

The illustrative machine also comprises severing means 22 operable to sever successive piston rings shaped by the shaping means from the remainder of the strip 10. The position of the severing means 22 is indicated diagrammatically in FIG. 1. It is positioned so that it can sever the strip 10 slightly downstream of the movable guide 20. After leaving the movable guide 20, the strip 10 passes through the severing means 22 and then forms a complete turn passing over an end portion of the guide and over the guides 18 and 20 (in FIG. 1 only less than one turn of the strip 10 is shown). During this turn the strip 10 is displaced sideways relative to the guides 14, 18 and 20 so that the strip forms a portion of a helix. The severing means 22 is operable to sever this complete turn of the strip 10 (which forms a complete piston ring) from the remainder of the strip 10.

The severing means 22 comprises a blade member 24 (see FIG. 2) arranged to be moved transversely of the strip 10 into the strip, and an anvil member 26 arranged to brace the strip 10 against movement away from the blade member 24 so that movement of the blade member 24 can sever the strip 10.

The illustrative machine also comprises displacing means 28 operable during each operation of the severing means 22 to displace the severing means, ie the blade member 24 and the anvil member 26, to substantially reduce the relative movement between the severing means and the point on the strip 10 at which the strip is severed. The displacement is along a linear path which extends tangentially to the path of movement of the point on the strip 10 at which the strip is severed.

The displacing means 28 and the severing means 22 of the illustrative machine are mounted on a machine frame 30. Supported on the frame 30 for vertical adjustment is a support plate 32. The plate 32 is adjusted to the required height on the frame 30 and then clamped by clamping screws (not shown). A further support plate 34 is supported on the plate 32 for horizontal adjustment and after adjustment can be clamped in the required position by clamping screws (not shown). The further plate 34 carries a horizontally extending pivot pin 36 whose longitudinal axis is aligned, by the vertical adjustment of the plate 32 and the horizontal adjustment of the plate 34, with the point at which the severing means 22 is to sever the strip 10. The pin 36 provides an axis about which said linear path along which the severing means 22 is displaceable, can be angularly adjusted, this axis being normal to the plane of the piston ring to be severed. Supported by the plate 34 and pivotally adjustable about the pin 36 is a bracket 38 which has a horizontally-extending arm 40 which supports a horizontally extending support plate 42. The bracket 38 can be clamped in its adjusted position about the pin 36 by clamping screws (now shown). The support plate 42 has a further support plate 44 mounted on an underside thereof for adjustment in a horizontal direction towards or away from the plates 32 and 34. The plate 44 can be clamped in it adjusted position by clamping screws (not shown). This support plate 44, is thus, adjustable in a vertical plane by movement of the support plates 32 and 34 relative to the fixed machine frame 30, can be pivotally adjusted about the pin 36, and can be adjusted horizontally. This adjustment adjusts the point at which the strip 10 is severed.

Secured to the underside of the support plate 44 is a horizontally-extending slide-defining member 46 which can be pivotally adjusted relative to the support plate 44 about a vertically extending pivot pin 48 mounted on the plate 44. After adjustment about the pin 48, the slide-defining member 46 is clamped to the plate 44 by clamping screws (not shown). This pin 48 is adjusted to have its longitudinal axis aligned with the point at which the strip 10 is severed by the severing means 22 and adjustment of the slide-defining member 46 about the pivot pin 48 is utilised to accommodate the inclination of the strip 10 at the point at which it is-severed, this inclination being caused by its partly helical form. The pin 48 provides an axis about which said linear path along which the severing means 22 is displaceable can be angularly adjusted, this axis being in the plane of the piston ring to be severed.

Figure 2:
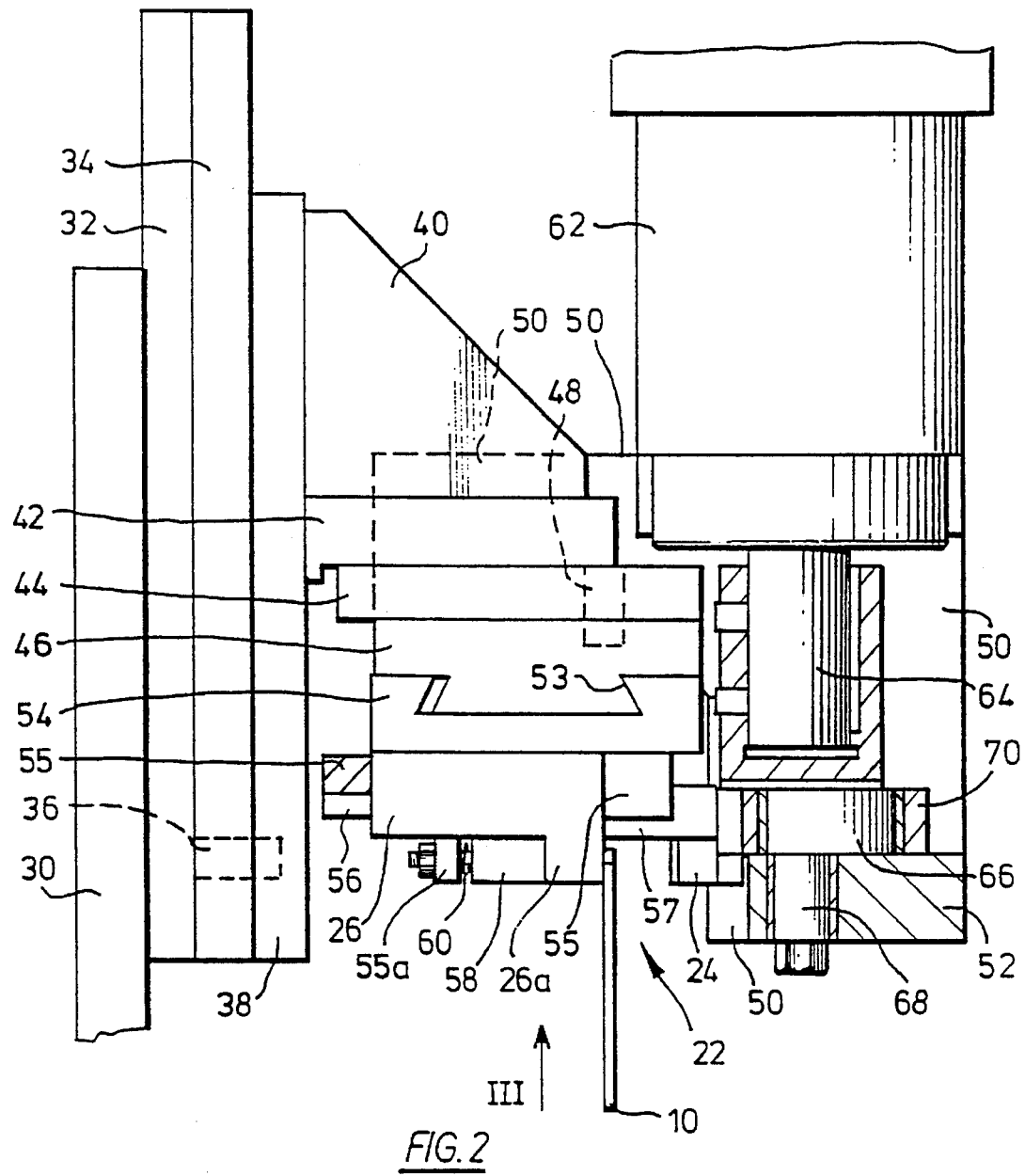
FIG. 2 is an elevational view of the displacing means and severing means of the illustrative machine partly in section and with one side plate removed.

The slide-defining member 46 carries two-vertically extending support plates 50 between which further parts of the displacing means 28 and the severing means 22 are supported. Only one of the plates 50 is shown in FIG. 2. These support plates 50 are joined by the slide-defining member 46 and also by a horizontally extending bar 52. The support plates 50 extend away from the frame 30 and then downwardly to join the bar 52.

A horizontally-extending slideway 53 is formed on the underside of the slide-defining member 46 and a sliding member 54 is slidable on this slideway 53. The plates 50 do not cover the ends of the slideway 53 so that the sliding member 54 can project beyond the slide-defining member 46. The direction of the slideway 53 is substantially tangential to the path of movement of the strip 10 at the point at which it is severed and, as will become apparent, the displacing means 28 is operable to displace the severing means 22 along this slideway.

Supported on the underside of the sliding member 54 is a slide-defining member 55 defining a horizontally-extending slideway 56 which extends perpendicularly to the slideway 53 on which the member 54 slides on the member 46. Slidably supported on the slide-defining member 55 is a blade support member 57 on which the blade member 24 is mounted.

The slide-defining member 55 also acts as an anvil support for the anvil member 26 which is mounted thereon. The anvil member 26 is clamped to one side of the member 55 and has a forward portion 26a which projects downwardly further than the rest of the member 26. An edge 26b of the member 26 is provided with a tungsten strip to provide a severing edge. An edge 24a of the blade member 24 is also provided with such a tungsten strip.

Mounted on the underside of the slide-defining member 55 is a stripper member 58 having a surface 58a which is normally co-planar with the surface of the anvil member 26. The stripper member 58 is mounted on a slideway 59 on the underside of the member 55, the slideway 59 extending parallel to the slideway 56. The stripper member 58 is mounted on a spring 60 to yield along the slideway 59 in a horizontal direction away from the blade member 24. The spring 60 bears against a bracket 55a which projects downwardly from the slide-defining member 55. The bracket 55a passes through a clearance slot 57a in the blade support member 57, the slot 57a also providing clearance in the member 57 to enable the engagement between the stripper member 58 and the slideway 59. The spring 60 surrounds a bolt 61 which is threadedly-received in the bracket 55a and is a sliding fit in a bore in the stripper member 58. This bore has a shoulder therein on which the spring 60 also bears. The bolt 61 has a head which is received in a recess in the surface 58a. The position of the head of the bolt 61 controls the normal position of the stripper member 58 which can be adjusted by turning the bolt 61 in the bracket 55a. The bolt 61 is locked in its adjusted position by a locking nut 61a. The stripper member 58 comprises spring-loaded stripper means of the machine.

The displacing means 28 of the illustrative machine also comprises a servo-motor 62 which is operable to displace the severing means 22 along its path, defined by the slideway 53, in substantial synchronisation with the movement of the point on the strip 10 at which the strip is severed. The motor 62 also operates the severing means 22. The motor 62 is mounted between the support plates 50 above the bar 52 and is disposed vertically with its output shaft 64 extending downwardly. The output shaft 64 is connected to an eccentric 66 mounted on the bar 52 for rotation about a shaft 68 supported by the bar 52. The eccentric 66 is received within a block 70 so that, when the motor 62 is operated, the block 70 describes a circular path about the shaft 68. The circular path of the block 70 lies in a horizontal plane so that the movement of the block 70 has a component which is upstream or downstream of the strip 10, ie parallel to the direction of the slideway 53, and also a component which is towards or away from the strip 10, ie parallel to the direction of the slideway 56. The blade support member 57 is clamped to the block 70 for movement therewith. The block 70 has a projection in which an adjusting screw 72 is threadedly-received. The screw 72 is used to adjust the blade member 24 on the blade support member 57 before the blade member 24 is clamped in its adjusted position by clamping screws (not shown).

The component of the path of the block 70 which is upstream and downstream of the strip 10 is utilised to displace the blade member 24 and the anvil member 26 tangentially of the path of movement of the point on the strip 10 at which the strip is severed.

The upstream and downstream component of the movement of the block 70 causes the parts mounted on the slideway 53 to move along this slideway, the parts being the sliding member 54, the slide-defining member 55, the blade support member 57, the stripper member 58, the anvil member 26, and the blade member 24. The other component of the movement of the block 70, towards and away from the strip 10, causes the blade support member 57 to slide along the slideway 56 thereby causing the blade member 24 to approach or retreat from the anvil member 26 and the stripper member 58.

Thus, the sliding member 54 and, hence, the anvil member 26 move upstream and downstream of the strip 10 while the blade support 57 and the blade member 24, as aforementioned, perform a circular movement which keeps them in synchronisation with the upstream and downstream movement of the anvil member 26 and also brings the blade member 24 towards and away from the anvil member 26.

Specifically, the motor 62 rests with the blade member 24 at its furthest from the strip 10 until the arrival of the point on the strip 10 at which the strip is severed is imminent. The motor 62 then operates to move the block 70 once around its path. During the first quarter of this circular movement, the blade member 24 moves upstream and towards the strip 10. During the second quarter, the blade member 24 moves downstream and towards the strip 10 and, during the third and fourth quarters of the movement, the blade member 24 returns to its starting position. Over a small arc of this circular movement, at the end of the second quarter thereof, the blade member 24 contacts and severs the strip 10. During a small arc at the beginning of the third quarter, the blade member withdraws from the strip 10. During these two small arcs, the speed of the blade member 24, and the anvil member 26 in the downstream direction, is intended to match or substantially match, the speed of the strip 10 so that there is substantially no relative movement between them. In order to obtain a closer match of speeds, the speed of the motor 62 is varied during these arcs to be faster at the beginning of the first arc and the end of the second arc and slower where these arcs join one another, ie the motor 62 is decelerated and then accelerated.

Operation of the motor 62, thus, displaces the severing means 22 along a path which extends substantially tangentially to the path of movement of the point on the strip 10 at which the strip is severed. Furthermore, since the operation of the motor 62 also moves the blade member 24 towards and away from the strip 10 and the anvil member 26, the motor 62 also operates the severing means 22.

Figure 3:
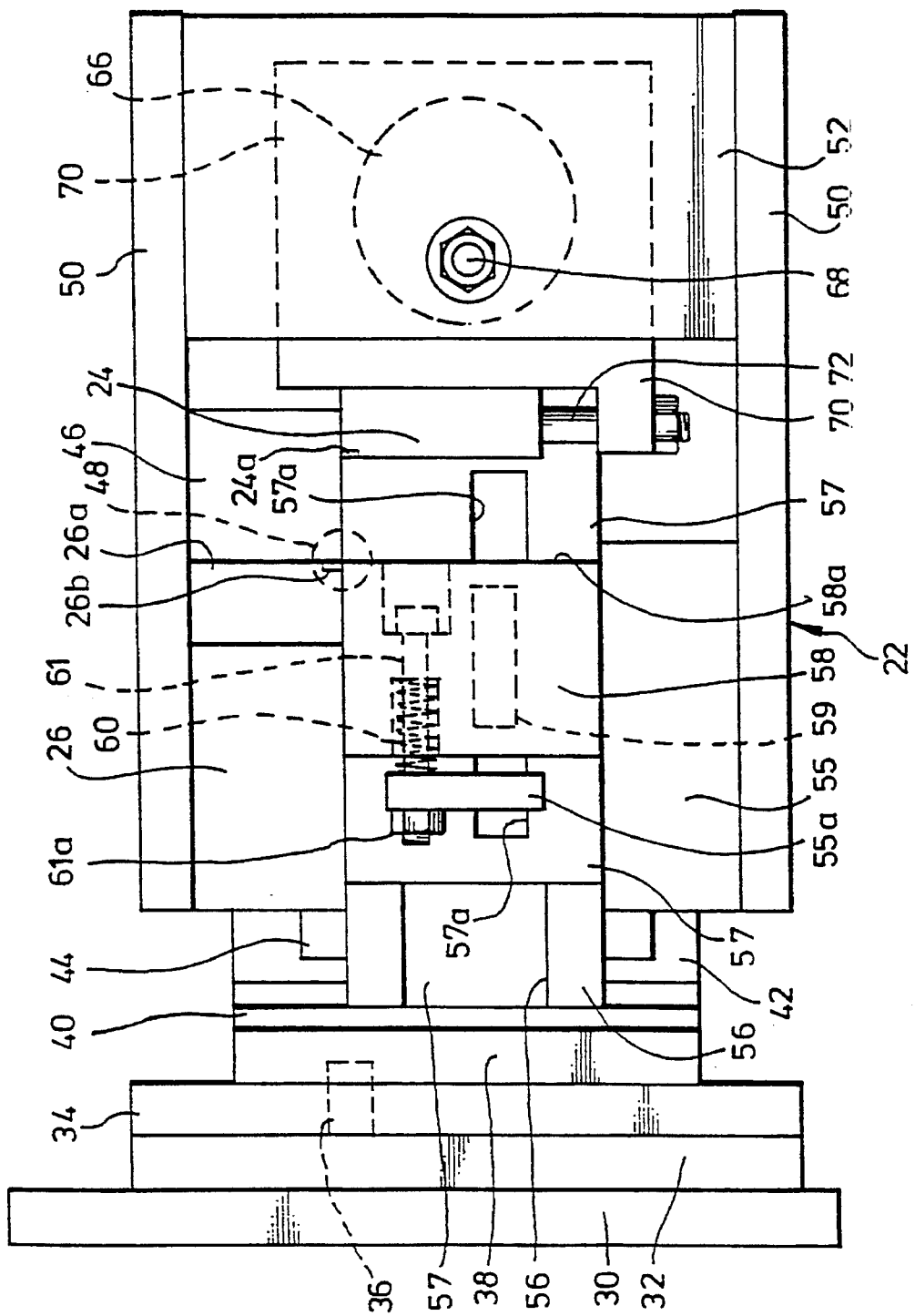
FIG. 3 is a view in the direction of the arrow III in FIG. 2, on a larger scale.

The stripper member 58 (see FIG. 3) is arranged opposite the blade member 24 on the opposite side of the strip 10. The stripper member 58 has a rest position in which is forms a continuous surface with the anvil member 26 but can yield against the spring 60 away from the strip 10 under pressure provided by the blade member 24 pressing against the strip 10. The purpose of the stripper member 58 is to prevent distortion of the strip 10 by allowing the strip 10 to move past the anvil member 26 and then be returned by the stripper member 58 under the action of the spring 60.

Control means of the illustrative machine (not shown) is operable to operate the servo motor 62 and, hence, the severing means 22, in response to the feeding of a predetermined length of the metal strip by the rollers 12. The control means receives a signal representing the length of strip 10 which has been fed from an encoder 80 which runs on the strip 10. The signal is utilised by the control means for controlling both the timing and the speed of operation of the servo motor 62.

I claim:

1. A machine for manufacturing piston rings from metal strip, the machine comprising feeding means operable to feed metal strip, shaping means operable to shape metal strip fed by the feeding means so that successive portions of the strip are formed into piston rings of a desired shape, and severing means operable to sever successive piston rings shaped by the shaping means from the remainder of the strip, characterised in that the machine also comprises displacing means operable during each operation of the severing means to displace the severing means along a linear path which extends substantially tangentially to the path of movement of the point on the strip at which the strip is severed to substantially reduce the relative movement between the severing means and said point.

2. A machine according to claim 1, characterised in that the displacing means comprises a servo motor operable to displace the severing means along its path in substantial synchronisation with the movement of said point on the strip.

3. A machine according to claim 2, characterised in that the servo motor also operates the severing means.

4. A machine according to claim 3, characterised in that the servo motor drives an eccentric arranged so that rotation of the eccentric causes displacement of the severing means and operation thereof.

5. A machine according to claim 1, characterised in that the displacing means is operable in response to the feeding of a predetermined length of the metal strip by the feeding means.

6. A machine according to claim 5, characterised in that the machine comprises an encoder operable to provide a signal representing the length of the strip which has been fed, said signal being utilised for controlling the operation of the displacing means and the severing means.

7. A machine according to claim 1, characterised in that the shaping means comprises an adjustable guide for imparting a fixed radius of curvature to the metal strip, said fixed radius of curvature being a minimum radius of curvature, and at least one movable guide acting to increase the radius of curvature of the metal strip is accordance with the desired shape of the piston ring.

8. A machine according to claim 1, characterised in that the severing means comprises a blade member arranged to be moved into the strip, and an anvil member arranged to brace the strip against movement away from the blade member.

9. A machine according to claim 8, characterised in that the severing means also comprises spring-loaded stripper means co-planar with said anvil member and displaceable by the movement of said blade member.

10. A machine according to claim 1, characterised in that said linear path is adjustable angularly about an axis extending normally to the plane of a piston ring to be severed.

11. A machine according to claim 1, characterised in that said linear path is adjustable angularly about an axis extending in the plane of a piston ring to be severed.

* * * * *

UNITED STATES PATENT AND TRADEMARK OFFICE
CERTIFICATE OF CORRECTION

PATENT NO. : 5,502,880
DATED : April 2, 1996
INVENTOR(S) : Richard J. Sharp

It is certified that error appears in the above-indentified patent and that said Letters Patent is hereby corrected as shown below:

Column 6, line 54, "is" should be --it--

Column 8, line 13, "is" should be --in--

Signed and Sealed this

Thirtieth Day of July, 1996

Attest:

BRUCE LEHMAN

*Attesting Officer*    Commissioner of Patents and Trademarks